United States Patent Office 3,249,579
Patented May 3, 1966

3,249,579
THERMOINSULATING COMPOSITION
Philip Kwiatanowski, Jr., Somerville, N.J., and Theodore L. Shebs, Saratoga, Calif., assignors to Johns-Manville Corporation, New York, N.Y., a corporation of New York
No Drawing. Filed Feb. 1, 1961, Ser. No. 86,335
2 Claims. (Cl. 260—33.8)

This invention relates to an improved adhesive and insulating composition. More particularly, it relates to a novel type of composition characterized by improved heat resistant and heat decomposition characteristics, which composition may be adapted as a pressure-sensitive adhesive. This invention is especially concerned with the use of such materials in conjunction with the insulation and protection of components associated with rockets, missiles and the like, which insulation is subjected to thermal shock and high temperatures.

As is generally understood, the firing of rockets, missiles and the like, is accompanied by a substantial amount of heat and pressure. Extensive research and development programs have been continually carried out to afford the best materials capable of withstanding the extraordinarily high heat and pressure. Not only must the surrounding components of rocket and missile motors be insulated, but additionally, all other elements which may in some manner be exposed to the ambient heat and pressure, must likewise be properly insulated and protected.

With regard to the present insulation systems, it is generally required that the material be cured under substantial heat and pressure in order to secure a proper bond to the rocket shell and to bond the layers of the material together. This curing prior to the firing, of course, necessitates a substantial amount of time and thereby increases the cost of manufacture of each missile. Accordingly, an insulating material which could be applied without necessitating any pre-firing curing would be of great benefit to the missile industry.

Another area wherein adequate insulation and protection is required is with regard to the umbilical cables. In the firing of rockets or missiles, the associated high temperature, thermal shock, and high velocity of the gases, have in the past caused considerable damage to these cables. In many situations, the cables have become completely unusable after the initial firing, thereby necessitating costly replacements having regard not only to the cost of materials, but also to the cost of units of time lost. Where the cables have been found not to be destroyed completely, a great deal of very expensive repair has been required in order to restore the cable to a workable condition. Again the desire for cost reduction is apparent. In this regard it is believed that if a composition could be applied to the cables which would properly resist the thermal shock and associated temperature, the cables could remain in an operable condition through several successive firings, thereby greatly enhancing the economics of the process.

It is concluded that a pressure-sensitive composition, generally in the form of a laminated sheet or tape, might solve this problem. However, to date all of the compositions considered have proved to be unsatisfactory as they could not properly resist the conditions surrounding the firing.

It is therefore a principal object of the present invention to provide an insulating and adhesive composition which will overcome the foregoing disadvantages while providing suitable characteristics.

It is an additional object of this invention to provide an insulating composition possessing new and improved heat and shock resistant characteristics.

It is another object of this invention to provide a novel composition of matter which may be especially adapted as a pressure-sensitive insulating composition.

It is still another object of this invention to provide a pressure-sensitive adhesive composition which may be applied to the internal structure of various components of a rocket such as the motors, or other firing mechanisms, which composition does not necessitate a pre-firing curing in order to insure proper bonding to the shell.

A still further object of this invention is to provide a new pressure-sensitive adhesive composition which may be used to insulate umbilical cables in order to impart substantially improved protection during the firing of missiles and the like.

To the accomplishment of these objects and to such others that may hereafter appear, the invention comprises the features set out in the following description.

The above objects are realized by our invention, which, briefly stated, comprises a new composition of matter containing extremely fire-resistant components which not only possess that characteristic, but are additionally pressure-sensitive. More specifically, the composition comprises neoprene; a fire-resistant tackifier, such as Aroclor; resins and inert filler, such as asbestos fiber; carbon black, or clay; and non-flammable solvent, such as tetrachloroethylene. Additional components may be added, such as pigments, fillers, and associated pressure-sensitive adhesives, dependent on the permissible cost and the desired characteristics of the final product.

The practice of this invention is further illustrated by the following example, wherein the parts are in percentage by weight unless otherwise indicated:

A mixture of materials with the following percentages:

| | Percent |
|---|---|
| Neoprene WRT | 43.0 |
| Magnesium oxide | 1.4 |
| Antioxidant, such as Neozone D | 1.0 |
| Carbon black | 7.6 |
| Clay | 41.8 |
| Tackifier Aroclor 1262 | 5.0 |
| Dixylyl disulfide reclaiming agent | 0.2 | was loaded in a Banbury mixer, and a ram pressure of 40 p.s.i.g. was applied. A pointer setting of 230° F. was employed under high speed conditions. The mixer was run for a total of 4 minutes. The resulting mixture was added to a tumbler-churn containing the tetrachloroethylene. Sufficient solvent was supplied so as to amount to 82.7% of the final composition. The mixture was churned for approximately 24 hours until smooth.

Tests were run to evaluate the effectiveness of the composition of the instant invention. Samples were made by applying the composition prepared according to the above procedure to an asbestos cloth so that the finished article was approximately 50 percent asbestos fiber. The resultant article was compared with a neoprene coated asbestos cloth and a neoprene coated cotton cloth, the percentages of fiber being substantially the same. Samples were prepared by making ten strips of each material 1 in. by 7 in. The strips were single-plied and joined together with an approximate ¼ in. overlap to form a sheet approximately 7 in. by 7 in. The sheets were subjected to vibration at a rate of 2000/min. of ⅛ in. amplitude for 15 minutes. A flame of 2000° F. was applied to the vibrating sample. The neoprene coated cotton cloth burned, leaving a 3 to 4 in. hole. The neoprene coated asbestos cloth, while it did not burn, was characterized by severe delamination, allowing the flame to penetrate the laps. The article produced according to the instant invention did not burn nor did it delaminate. The test procedure used was quite similar to present CCA test procedure.

The following disclosure sets forth the various alternative compositions or compounds among those preferred materials useful within the scope of the instant invention.

With regard to the rubber component, the chloroprenes or chlorinated rubbers are preferred. The preparation of polychloroprene from chloroprene is well known. After suitable purification by careful fractionation, chloroprene is emulsified in water by means of sodium rosinate soap and polymerized at 40° C. with the aid of potassium persulfate as a catalyst, and in the presence of elemental sulfur as a modifier.

Moreover, chloroprene can be copolymerized with relatively small amounts of other monomers. For example, styrene comonomer tends to make a polychloroprene with less crystallization tendency, isoprene comonomer tends to make for better low-temperature service, and acrylonitrile for good processibility and oil resistance.

Examples of suitable chloroprene (2-chloro-butadiene) polymers useful in accordance with this invention are the neoprene rubbers. Neoprene is a generic name applied to polymers of chloroprene or mixtures of chloroprene and other polymerizable monomers, the major constitutent of which is chloroprene.

Specific examples of chloroprene latices are those sold under the trade names of "Neoprene WRT," "Neoprene 571," "Neoprene 842–A," "Neoprene 601–A," "Neoprene 735," and "Neoprene 572." All of these latices are alkaline dispersions of polymerized chloroprene (2-chloro-1,3-butadiene) in water containing dispersing and stabilizing agents.

Other usable chlorinated rubbers suitable for practicing the present invention may be of the commercial type of product made and sold under the trade name of Parlon.

The tackifier component is preferably of a fire-resistant or fire retardant hydrocarbon composition. Particularly useful are the Aroclor compositions. This material consists of a series of chlorinated polyphenyl which may vary from water-white liquids and like colored oils to amber colored resins and crystalline solids. These materials may be represented by the following series:

it being important that the majority of the filler component be selected from the class of inert materials. Inert fire retardant inorganic or mineral fillers which may be used include fibrous fillers, such as glass fibers, asbestos, various silicate fibers, and known fillers, such as whiting, clay, ground glass, kaolin and the like.

The solvent material employed is a non-flammable hydrocarbon exemplified by the commercially available chlorinated solvents, such as carbon tetrachloride, trichloromonofluoro ethylene and the like. Particularly useful is the tetrachloroethylene solvent.

The procedure generally followed for preparing a composition comprises pre-mixing the rubber and the insoluble materials of the formulation in a mill or mixing machine, such as a Banbury mixer. The mixed product is then dispersed in the solvent together with any liquid components.

The important ingredients in the composition are the rubber, filler and solvent components. The rubber is preferably a Neoprene W product because of the good tack retaining characteristics of that material. It is preferred that the rubber constituent be between about 35% to about 55% by weight of the dry composition. The remainder of the dry composition should consist essentially of an inert filler. The purpose of the ranges is to spell out the best products, but materials may be prepared outside the range if one wishes to sacrifice various properties. That is, if too much filler were to be used, the composition would lose its tack and thereby lose part of its very desirable characteristics. Conversely, if too much rubber were to be used, the composition would become too tacky and thereby become difficult to handle. The amount of solvent to be used may likewise be varied so long as it remains consistent with the aims of the invention as heretofore in spelled out.

While the composition of the invention is thought to consist essentially of two constituents, the composition is open for the inconclusion of unspecified ingredients which do not materially affect the basic and novel characteristics of the composition as heretofore described.

TABLE I.—AROCLOR SERIES

| Aroclor No. | Form | Sp. gr. | Distillation range, ° C. | Flash point, ° F. | Fire point, ° F. | Acidity, mg. KOH/g. |
| --- | --- | --- | --- | --- | --- | --- |
| 1232 | Practically colorless, mobile oil | 1.265 | 290-325 | | | |
| 1242 | do | 1.378-1.388 | 322-365 | 348-356 | 633 | 0.01 |
| 1248 | Yellow tinted oily liquid | 1.447-1.457 | 330-370 | 379-384 | none | 0.01 |
| 1254 | Yellow tinted viscous oil | 1.538-1.548 | 365-390 | none | none | 0.01 |
| 1260 | Light yellow, soft, sticky resin | 1.618-1.629 | 385-420 | none | none | 0.015 |
| 1262 | Light yellow, sticky, clear resin | 1.646-1.653 | 373-404 | none | none | 0.02 |
| 1270 | White, crystalline powder | 1.944-1.960 | 450-460 | none | none | 0.175 |
| 2565 | Brown-black, opaque resin | 1.724-1.740 | | none | none | 1.26 |
| 4465 | Yellow, transparent, brittle resin | 1.712-1.723 | | none | none | 0.05 |
| 5442 | Yellow, transparent, sticky resin | 1.432-1.447 | | 477 | 662 | 0.028 |
| 5460 | Yellow, transparent resin | 1.740-1.745 | | none | none | 0.07 |

However, any flame retardant substance may be used in the practice of the invention which is capable of imparting tack and/or adhesive to the rubber. The highly chlorinated organic flame resistant substances may be any one of several types of chlorinated organic materials, such as chlorinated oils of vegetable or animal origin, chlorinated paraffin wax or wax-like substances and the like. The best results are obtained where the compound contains a majority of chemically combined chlorine.

The antioxidant may be any one of many well known commercially available materials such as phenyl beta naphthylamine made and sold under the trademark "Neozone D," and p-(p-tolyl-sulfonylamido)-diphenylamine made and sold under the trademark "Aranox." "Polypale Ester 10" is a glycerol ester of polymerized rosin. "Pentalyn H" is a modified pentaerythritol ester of rosin. Zinc butyl xanthate may be obtained under the trademark "ZBX,"

Various types of filler materials may be used in addition to the clay and carbon black of the above example, The remainder of the constituents are added to effect the most preferred embodiment. The plasticizer is used in the same manner as generally recognized and is chosen to impart adhesiveness to the composition and is selected for the particular tack properties desired.

The antioxidant functions to improve the aging characteristics of the rubber and to minimize its oxidation during subsequent storage. Likewise there may be added to the composition any reclaiming agents, metallic oxides, etc., all of which are useful in controlling the aging and tackiness of the composition. The amount so used may vary from nominal amounts to as much as 25% or more of the composition insofar as they do not affect to adversely the usefulness of the invention.

In preparing an article using the composition, the material to which it is to be applied, such as cloth or paper is saturated with the insulating composition. The solvent is evaporated and the coated material is heated to cure the composition. The product may be made in various forms, either in large sheet size or in small, convenient, easily dispensable tape form.

Pressure-sensitive sheets or laminates utilizing the composition may be made in any of the well recognized manners now used commercially. The composition of the invention may be applied to any of the recognized bases, preferably for purposes of the invention, to an asbestos paper. In one alternative the material may be coated upon the tacking material, partially curved in the normal manner. The material is then wound on rolls for subsequent use. Partial curing is most desirable so as to allow the product to remain in a workable or moldable condition.

One very important aspect of the instant invention is that while the product is applied in the final use in a partially cured state, no further work need be done at that time to effect the final product. This is so as the heat and other conditions associated with the blast or thermoshock positively affect the final cure. No prior art composition or insulation is known which functions in this very efficient and time-saving manner. Thus not only is the product completely workable during installation but requires no post-treatment on behalf of the installer.

Various materials may be used to act in the manner of a release agent. Coatings may be applied to the back side, care being taken, however, to avoid flammable materials. The preferred method, which removes any possible danger, is the use of a liner material. One satisfactory material found very effective is embossed polyethylene.

As will be readily appreciated by those skilled in the art, various variations in the selection of the individual ingredients of the insulating composition may be acceptable. Besides variation in the individual ingredients, many other variables are present in the process, such as the density of the solution, the particular nature of the material to be treated, the degree of treatment necessary, depending upon the particular solvent chosen, and the time and temperature at which the composition is cured. These controls in typical commercial processes are not readily susceptible to precise definition since various uncontrollable factors, such as the ambient atmospheric conditions may alter the process operation, but they will be well understood by those skilled in the art.

It is believed the above provides a complete description of the invention in such manner as to distinguish it from other inventions and from what is old, and provides a description of the best mode contemplated of carrying out the invention and thereby complies with the patent statutes.

What we claim is:

1. A shock-resistant thermal insulating composition consisting essentially of, by solids weight, about 5 to 55% elastomer selected from the group consisting of chloroprene and chlorinated rubber, at least about 45% inert filler and about 5% chlorinated polyphenyl tackifier.

2. A shock-resistant thermal insulating composition consisting essentially of, by solids weight, about 43% 2-chlorobutadiene polymer, about 42% clay, about 5% chlorinated polyphenyl tackifier, about 8% carbon black and the remainder aging and anti-oxidant compounds.

References Cited by the Examiner

UNITED STATES PATENTS

| | | | |
|---|---|---|---|
| 2,094,919 | 10/1937 | Hughes | 154—44 |
| 2,353,494 | 7/1944 | Patten et al. | 154—44 |
| 2,742,942 | 4/1956 | Owen | 260—41 |
| 2,959,562 | 11/1960 | Klug | 260—33.8 |
| 2,968,639 | 1/1961 | Caldwell et al. | 260—33.8 |
| 3,086,951 | 4/1963 | Wile | 260—33.8 |

MORRIS LIEBMAN, *Primary Examiner.*

LEON J. BERCOVITZ, *Examiner.*

L. G. KASTRINER, K. B. CLARKE, J. S. WALDRON,
*Assistant Examiners.*

UNITED STATES PATENT OFFICE
CERTIFICATE OF CORRECTION

Patent No. 3,249,579                              May 3, 1966

Philip Kwiatanowski, Jr., et al.

It is certified that error appears in the above identified patent and that said Letters Patent are hereby corrected as shown below:

Column 6, line 15, "about 5" should read -- about 35 --.

Signed and sealed this 17th day of February 1970.

(SEAL)
Attest:

Edward M. Fletcher, Jr.                WILLIAM E. SCHUYLER, JR.
Attesting Officer                         Commissioner of Patents